United States Patent
Dao (10) Patent No.: US 11,637,710 B2
(45) Date of Patent: Apr. 25, 2023

(54) SYSTEMS AND METHODS FOR FEDERATED PRIVACY MANAGEMENT

(71) Applicant: JPMORGAN CHASE BANK, N.A., New York, NY (US)

(72) Inventor: Tuan Dao, Richardson, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 133 days.

(21) Appl. No.: 17/107,731

(22) Filed: Nov. 30, 2020

(65) Prior Publication Data
US 2021/0176076 A1  Jun. 10, 2021

Related U.S. Application Data (60) Provisional application No. 62/946,254, filed on Dec. 10, 2019.

(51) Int. Cl.
*H04L 9/32* (2006.01)
*H04L 9/40* (2022.01)

(52) U.S. Cl.
CPC .......... *H04L 9/3263* (2013.01); *H04L 9/3213* (2013.01); *H04L 63/1425* (2013.01); *H04L 63/168* (2013.01)

(58) Field of Classification Search
CPC ... H04L 63/0236; H04L 43/08; H04L 45/745; H04L 47/24; H04L 63/416; H04L 63/1425; H04L 63/1458
See application file for complete search history.

(56) References Cited

U.S. PATENT DOCUMENTS

| 10,715,547 B2 * | 7/2020 | Edwards | H04L 63/1466 |
| 11,108,662 B2 * | 8/2021 | Li | H04L 41/12 |

(Continued)

FOREIGN PATENT DOCUMENTS

| KR | 20150013977 A | * | 2/2015 | ............. H04L 12/66 |
| WO | 2016064888 | | 4/2016 | |
| WO | WO-2016064888 A1 | * | 4/2016 | ......... H04L 63/0281 |

OTHER PUBLICATIONS

International Search Report, dated Mar. 11, 2021, from corresponding International Application No. PCT/JS2020/064076.

(Continued)

*Primary Examiner* — Lynn D Feild
*Assistant Examiner* — Saad Ahmad Abdullah
(74) *Attorney, Agent, or Firm* — Greenberg Traurig LLP (57) ABSTRACT

Systems and methods for federated privacy management are disclosed. In one embodiment, a method for federated privacy management may include: (1) receiving, at a user management node, and from a client application executing on an electronic device, a device identifier; (2) receiving, by the user management node, and from a second layer node in a multi-layer federated privacy management network, data comprising at least one of browsing data and application data from a web host or a server, wherein the data is in response to an internet protocol request from the client application via a first layer node and the second layer node to the web host or the server, and the data is associated with the device identifier; (3) receiving, at the user management node, a request for the data from the client application using the device identifier; and (4) communicating the data to the client application.

12 Claims, 4 Drawing Sheets

(56) References Cited

U.S. PATENT DOCUMENTS

2016/0034442 A1   2/2016  Levy et al.
2020/0296112 A1*  9/2020  Namboodiri ............ G06F 21/44

OTHER PUBLICATIONS

Written Opinion of the International Searching Authority, dated Mar. 11, 2021, from corresponding International Application No. PCT/US2020/064076.

* cited by examiner

SYSTEMS AND METHODS FOR FEDERATED PRIVACY MANAGEMENT

RELATED APPLICATIONS

This application claims the benefit of, and priority to, U.S. Provisional Patent Application Ser. No. 62/946,254, filed Dec. 10, 2019, the disclosure of which is hereby incorporated, by reference, in its entirety.

The disclosures of U.S. patent application Ser. No. 16/598,734, and U.S. Provisional Patent Application Ser. Nos. 62/856,491 and 62/874,240 are also hereby incorporated, by reference, in their entireties.

BACKGROUND OF THE INVENTION

1. Field of the Invention

Embodiments generally relate to systems and methods for federated privacy management.

2. Description of the Related Art

In order to protect user privacy for online activities (such as browsing and application usage), an entity that provides such services has to access to the data traffic itself. Thus, users must trust that the entity will not misuse their personal data more than trusting a web host or application server to do the same. That essentially just transfers the trust of the users from one place to another.

SUMMARY OF THE INVENTION

Systems and methods for federated privacy management are disclosed. In one embodiment, a method for federated privacy management may include: (1) receiving, at a user management node, and from a client application executing on an electronic device, a device identifier; (2) receiving, by the user management node, and from a second layer node in a multi-layer federated privacy management network, data comprising at least one of browsing data and application data from a web host or a server, wherein the data is in response to an internet protocol request from the client application via a first layer node and the second layer node to the web host or the server, and the data is associated with the device identifier; (3) receiving, at the user management node, a request for the data from the client application using the device identifier; and (4) communicating the data to the client application.

In one embodiment, the data from the second layer node may include at least one of browsing data and application data from the web host or the server.

In one embodiment, the first layer node may receive the internet protocol request and a first IP address associated with the electronic device from the client application, may translate the first IP address into a second IP address, and may communicate the internet protocol request and the second IP address to the second layer node.

In one embodiment, the second layer node may execute a privacy service on the internet protocol request.

In one embodiment, the privacy service may include packet inspection, device fingerprint obfuscation, web security, an anti-malware application activity, logging of browsing/application history, etc.

In one embodiment, the second layer node may translate the second IP address into a third IP address and may communicate the internet protocol request and the third IP address to the web host or the server.

In one embodiment, the data may be encrypted with a private key for the client application.

In one embodiment, the second layer node may include a plurality of second layer nodes.

In one embodiment, the method may further include: receiving, at the user management node, registration information from the client application; requesting, by the user management node, an entitlement token from the first layer node or the second layer node; receiving, from the user management node and from the first layer node or the second layer node, the entitlement token; and communicating, by the user management node, the entitlement token to the client application, wherein the client application registers with the first layer node or the second layer node with the entitlement token.

According to another embodiment, a method for federated privacy management may include: (1) receiving, by a user management node, data from a second layer node in a multi-layer federated privacy management network, the data associated with a session identifier, wherein the data may be in response to an internet protocol request from a client application via a first layer node and the second layer node to a web host or a server; (2) receiving, at the user management node, a request for the data from a client application using the session identifier; and (3) communicating the data to the client application.

In one embodiment, the data from the second layer node may include at least one of browsing data and application data from the web host or the server.

In one embodiment, the first layer node may receive the internet protocol request and a first IP address associated with the electronic device from the client application, may translate the first IP address into a second IP address, and may communicate the internet protocol request and the second IP address to the second layer node.

In one embodiment, the second layer node may execute a privacy service on the internet protocol request.

In one embodiment, the privacy service may include packet inspection, device fingerprint obfuscation, web security, an anti-malware application activity, logging of browsing/application history, etc.

In one embodiment, the second layer node may translate the second IP address into a third IP address and may communicate the internet protocol request and the third IP address to the web host or the server.

In one embodiment, the data may be encrypted with a private key for the client application.

In one embodiment, the second layer node may include a plurality of second layer nodes.

In one embodiment, the method may further include: receiving, at the user management node, registration information from the client application; requesting, by the user management node, an entitlement token from the first layer node or the second layer node; receiving, from the user management node and from the first layer node or the second layer node, the entitlement token; and communicating, by the user management node, the entitlement token to the client application, wherein the client application registers with the first layer node or the second layer node with the entitlement token.

According to another embodiment, a system for federated privacy management may include: a multi-layer federated privacy management network comprising a first layer node and a second layer node; a user management node in communication with at least one of the first layer node and the second layer node; and a client application executed by an electronic device. The user management node may receive, from the client application, a device identifier for the electronic device. The first layer node may receive an internet protocol request and a first IP address associated with the electronic device from the client application, may translate the first IP address into a second IP address, and may communicate the internet protocol request and the second IP address to the second layer node. The second layer node may translate the second IP address into a third IP address and may communicate the internet protocol request and the third IP address to a web host or a server. The second layer node may receive data comprising at least one of browsing data and application data from the web host or the server and may associate it with the device identifier or a session identifier and may communicate the data and the association with the device identifier or the session identifier to the user management node. The user management node may receive the data and stores the data. The user management node may receive a request for the data from the client application using the device identifier or the session identifier. The user management node may communicate the data to the client application.

In one embodiment, the second layer node may further execute a privacy service comprising at least one of packet inspection, device fingerprint obfuscation, web security, an anti-malware application activity, logging of browsing/application history on the internet protocol request, etc.

In one embodiment, the system may further include a plurality of second layer nodes.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for federated privacy management.

In embodiments, the handling of online browsing or application data may be distributed among a plurality of independent nodes in a plurality of levels of a privacy management network. Each node may have distinct and separate responsibilities, and no nodes may have access to all of an individual's personal data and/or online browsing or application data. One or more of the nodes may be controlled by a user management node.

Figure 1A:
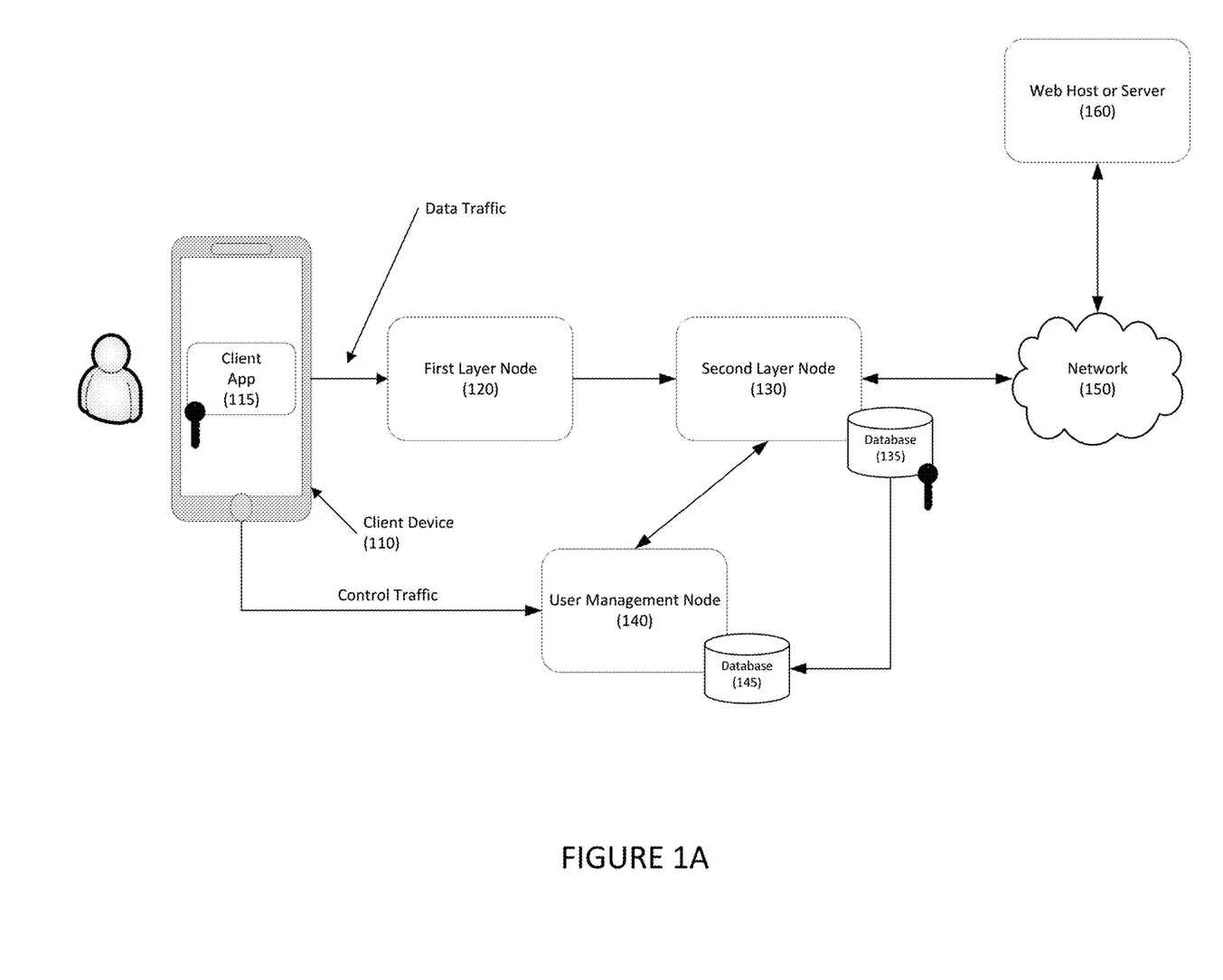
FIGS. 1A and 1B depict system for federated privacy management according to embodiments.
Figure 1B:
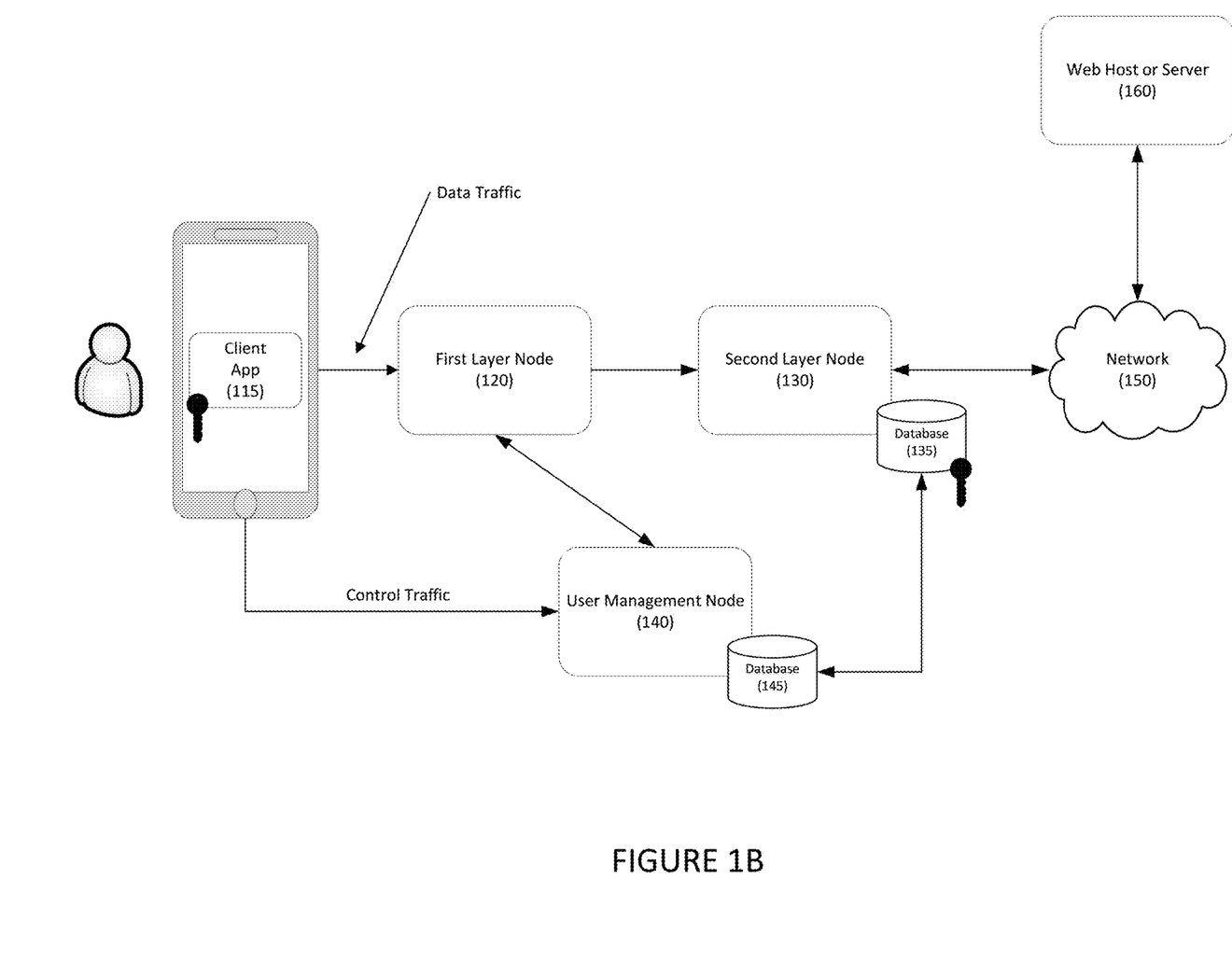

Referring to FIGS. 1A and 1B, systems for federated privacy management is provided according to embodiments. The systems may include client electronic device 110 executing client application 115, a plurality of nodes 120, 130, 140 (e.g., user management node 140, first layer node 120, second layer node 130), web host or server 160, and network connection 150 (e.g., an Internet connection) between one of the nodes (e.g., second layer node 130) and web host or server 160.

In embodiments, client application 115 may communicate with user management node 140, which may provide user management services. In one embodiment, user management node 140 may maintain the true user identity, may manage a user interface, experience, and/or billing, etc. The user's browsing or application data may not be visible to user management node 140.

In one embodiment, user management node 140 may receive a device identifier for electronic device 110 via client application 115. In one embodiment, the device identifier may be associated with electronic device 110 (e.g., a serial number, device fingerprint, etc.), it may be generated by the operating system, by client application 115, etc. Any suitable device identifier may be used as is necessary and/or desired.

User management node 140 may interact with second layer node 130 (FIG. 1A) or first layer node 120 (FIG. 1B) in order to obtain an entitlement token or similar. For example, after client application 115 contacts user management node 140, user management node 140 may request an entitlement token or similar from first layer node 120 (FIG. 1B) or second layer node 130 (FIG. 1A), and user management node 140 may return the entitlement token or similar to client application 115. The entitlement token may permit client application 115 to access first layer node 120 (FIG. 1B) or second layer node 130 (FIG. 1A) for initial registration purposes.

In one embodiment, the entitlement token may expire after a certain amount of time, or may expire after it is used. For example, the entitlement token may be valid for a sufficient time for the user to register with first node layer 120 or second node layer 130.

Client application 115 may register with first layer node 120 or second layer node 130 using the entitlement token or similar, and first layer node 120 or second layer node 130 may collect and maintain client application 115's device identifier and use that as authorization for future data traffic through browsing or using applications.

Client application 115 may maintain a key, such as a private key.

Client application 115 may route data traffic (e.g., browsing data application data, etc.) to first layer node 120. First layer node 120 may receive the data traffic from client application 115 having a first IP address (i.e., IP1), and may provide a pass-through where the data traffic exiting first layer node 120 is associated with a second IP address (i.e., IP2).

First layer node 120 may route the data traffic to second layer node 130, which may provide data privacy services (e.g., packet inspection, device fingerprint obfuscation, web security, anti-malware application activities, logging of browsing/application histories, etc. In one embodiment, the privacy services may be associated with a user reference, such as a reference to the user, a device (e.g., a device identifier), etc. The data traffic may leave second layer node 130 being associated with a third IP address (IP3).

Figure 2:
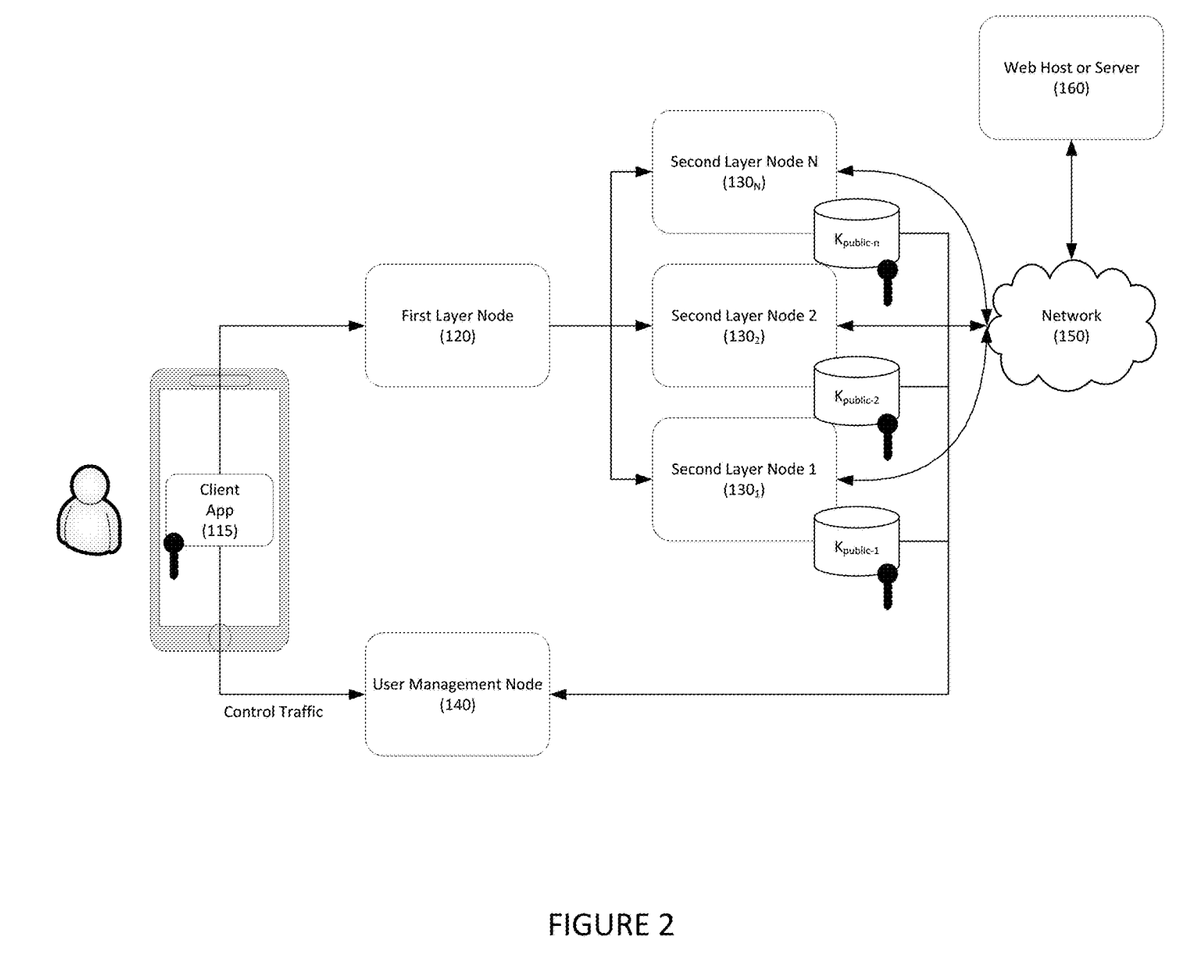
FIG. 2 depicts a system for federated privacy management according to another embodiment.

As illustrated in FIG. 2, a plurality of second layer nodes $130_1$, $130_2$, ... $130_n$ may be provided. For example, in response to an internet protocol request from the client application, the first layer node may call one of the plurality of second layer nodes (e.g., second layer node 1 $130_1$, second layer node 2 $130_2$, ... second layer node n $130_n$) to perform the data privacy services. Thus, each second layer node $130_1$, $130_2$, ... $130_n$ may only be exposed to, or contain, a portion of the browsing/application history for client application 115.

First layer node 120 may select one or more of the plurality of second layer nodes $130_1$, $130_2$, ... $130_n$ may in any suitable manner. For example, it may select second layer node $130_1$, $130_2$, ... $130_n$ randomly, it may rotate selections (e.g., the first request goes to second layer node 1 $130_1$, the second to second layer node 2 $130_2$, etc.), it may switch periodically (e.g., it uses second layer node 1 $130_1$ for a certain number of interactions or a period of time, then switches to second layer node 2 $130_2$, etc.

Second layer node 130 may receive data from web host or server 160, and may store the data in database 135. In one embodiment, second layer node 130 may encrypt the data using the client application 115's public key.

Second layer node database 135 may store browsing history, application data (including application data from web host or server 160), etc. and may encrypt the data with the client application 115's public key. Second layer node 130 may store the encrypted data to database 145. In one embodiment, the data may be associated with a session identifier for a session established by client application 115 and first layer node 120 or second layer node 130.

Figure 3:
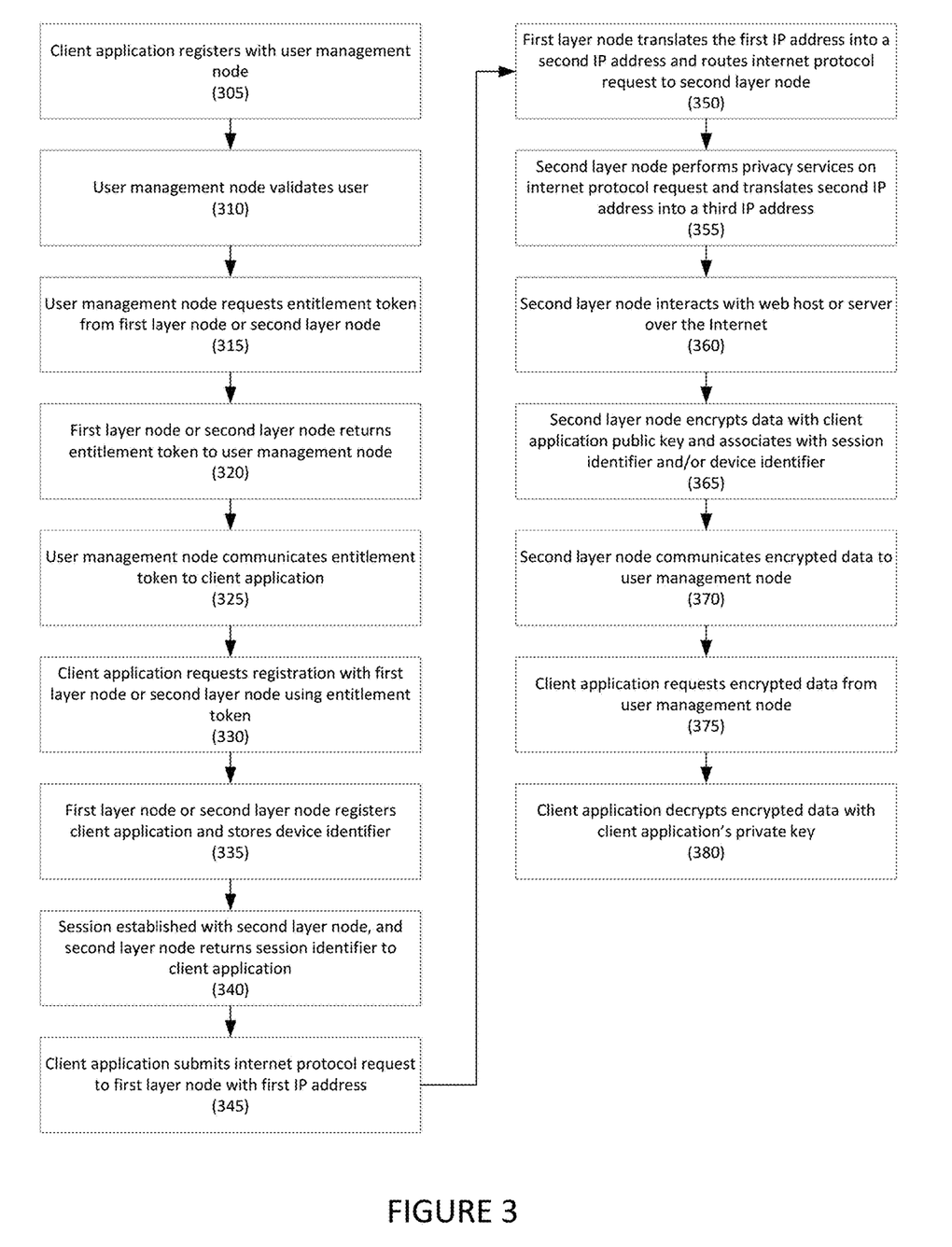
FIG. 3 depicts a method for federated privacy management according to embodiments.

Referring to FIG. 3, a method for federated privacy management is provided according to one embodiment.

In step 305, a user, via a client application, may register to use a privacy service with a user management node. The user management node may know the true user identity of the user.

In one embodiment, the user management node may capture a device identifier for the electronic device on which the client application is executed. Any suitable device identifier may be used as is necessary and/or desired.

In step 310, the user management node may validate the user. For example, the user management node may perform know your customer validations, and/or any other suitable validations, as is necessary and/or desired.

In step 315, the user management node may request an entitlement token or similar identifier from a first layer node or a second layer node. In one embodiment, the entitlement token may indicate that the user is authorized to use the routing services of the first layer node or the privacy management services of the second layer node.

In step 320, the first layer node or the second layer node may return the entitlement token to the user management node, and in step 325, the user management node may communicate the entitlement token to the client application.

In step 330, the client application may request registration with the first layer node or the second layer node using the entitlement token, and in step 335, the first layer node or the second layer node may register the client application. In one embodiment, the first layer node and/or the second layer node may store the device identifier for the device or user on which the client application is executed.

In one embodiment, as part of the registration process, the client application may provide its public key to the first layer node or the second layer node. The user management node may also provide the client's public key to the first layer node or the second layer node during the entitlement request in step 315.

In step 340, the client application may establish a session with the second layer node, and the second layer node may return a session identifier to the client application.

In one embodiment, a session identifier may not be used.

In one embodiment, if a plurality of second layer nodes used provided, the first layer node may select one of the second layer nodes for the session. In one embodiment, the first layer node may select the second layer node by any suitable manner, such as randomly, by rotation, periodic switching, etc. Each second layer node may relay its respective session identifier back to the client application via the first layer node.

In step 345, the client application may submit an internet protocol (e.g., HTTP, HTTPS, HTTP/2, QUIC, etc.) request to the first layer node with a first IP address. In one embodiment, the first IP address may be the IP address of the electronic device that is hosting the client application.

In step 350, the first layer node may translate the first IP address into a second IP address and may route the internet protocol request to the selected second layer node. For example, the first layer node may replace the first IP address with a second IP address.

In step 355, the second layer node may execute one or more privacy service on the internet protocol request, such as packet inspection, device fingerprint obfuscation, web security, anti-malware application activities, logging of browsing/application histories, etc. The second layer node may translate the second IP address, and browse using a third IP address. Any suitable method for translating the second IP address may be used as is necessary and/or desired.

In another embodiment, instead of making the second IP address, the second layer node may translate the second IP address into the third IP address.

In step 360, the second layer node may interact with the web host or server via the Internet using the third IP address. The second layer node may receive data from the web host or server.

In step 365, the second layer node may encrypt some, all or none of the user's browsing and/or application data, including data from the web host or server, using the client application's public key, and, in step 370, may push the encrypted browsing and/or application data to the user management node with the device identifier and/or the session identifier. If the data is pushed with the device identifier, the user management node would know the client application that the data is associated with. If the data is pushed with the session identifier, the user management node will not know the client application that is associated with the session identifier until the client application requests the data associated with the session identifier.

In step 375, the client application may request the encrypted browsing/application history from the user management node using the session identifier and/or the device identifier, and the user management node may provide the encrypted data to the client application.

In step 380, the client application may decrypt the encrypted browsing and/or application data using the client application's private key.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for federated privacy management, comprising:
    providing, by a component node of a multi-layer federated privacy management network, a privacy service;
    maintaining, by the multi-layer federated privacy management network, a reference, wherein the reference associates the privacy service with a user of a client device;
    receiving, at a user management node of the multi-layer federated privacy management network, and from a client application executing on an electronic device, a device identifier;
    requesting, by the user management node, in response to receiving the device identifier, and from a component node of the multi-layer federated privacy management network, an entitlement token, wherein the entitlement token indicates that the user of the client application is authorized to use the privacy service based on the reference;
    receiving, by the user management node, the entitlement token;
    sending, by the user management node, the entitlement token to the client application;
    registering, by the client application, the entitlement token to the component node of the privacy service;
    storing, by the component node, the device identifier;
    receiving, by the component node and from the client application, an internet protocol request;
    receiving, by the user management node, and from a second layer node in the multi-layer federated privacy management network, data from a web host or a server, wherein the data is in response to the internet protocol request from the client application via a first layer node and the second layer node to the web host or the server, and the data is associated with the device identifier;
    receiving, at the user management node, a request for the data from the client application using the device identifier; and
    communicating the data to the client application.

2. The method of claim 1, wherein the data from the second layer node comprises at least one of browsing data and application data from the web host or the server.

3. The method of claim 1, wherein the component node is the first layer node, and wherein the first layer node receives the internet protocol request and a first IP address associated with the electronic device from the client application, translates the first IP address into a second IP address, and communicates the internet protocol request and the second IP address to the second layer node.

4. The method of claim 3, wherein the second layer node executes the privacy service on the internet protocol request.

5. The method of claim 4, wherein the privacy service comprises at least one of packet inspection, device fingerprint obfuscation, web security, an anti-malware application activity, and logging of browsing/application history.

6. The method of claim 3, wherein the second layer node translates the second IP address into a third IP address and communicates the internet protocol request and the third IP address to the web host or the server.

7. The method of claim 1, wherein the data is encrypted with a private key for the client application.

8. The method of claim 1, wherein the second layer node comprises a plurality of second layer nodes.

9. The method of claim 1, further comprising:
receiving, at the user management node, registration information from the client application.

10. A system for federated privacy management, comprising:
- a multi-layer federated privacy management network comprising a first layer node and a second layer node;
- a user management node in communication with at least one of the first layer node and the second layer node; and
- a client application executed by an electronic device;

wherein:
- the multi-layer federated privacy management network maintains a reference, wherein the reference associates a privacy service with a user of a client device;
- the user management node receives, from the client application, a device identifier for the electronic device;
- the user management node requests, in response to receiving the device identifier, and from the first layer node, an entitlement token, wherein the entitlement token indicates that the user of the client application is authorized to use the privacy service based on the reference;
- the user management node receives the entitlement token;
- the user management node sends the entitlement token to the client application;
- the client application registers the entitlement token to the first layer node of the privacy service;
- the first layer node and the second layer node store the device identifier;
- the first layer node receives an internet protocol request and a first IP address associated with the electronic device from the client application, translates the first IP address into a second IP address, and communicates the internet protocol request and the second IP address to the second layer node;
- the second layer node translates the second IP address into a third IP address and communicates the internet protocol request and the third IP address to a web host or a server;
- the second layer node receives data comprising at least one of browsing data and application data from the web host or the server and associates it with the device identifier or a session identifier and communicates the data and the association with the device identifier or the session identifier to the user management node;
- the user management node receives the data and stores the data;
- the user management node receives a request for the data from the client application using the device identifier or the session identifier; and
- the user management node communicates the data to the client application.

11. The system of claim 10, wherein the second layer node further executes the privacy service comprising at least one of packet inspection, device fingerprint obfuscation, web security, an anti-malware application activity, and logging of browsing/application history on the internet protocol request.

12. The system of claim 10, further comprising a plurality of second layer nodes.

* * * * *